United States Patent [19]

Dotter

[11] Patent Number: 4,580,595
[45] Date of Patent: Apr. 8, 1986

[54] HYDRAULIC CHECK VALVE
[76] Inventor: John H. Dotter, 810 Ocean Monarch, 133 N. Pompano Beach Blvd., Pompano Beach, Fla. 33062
[21] Appl. No.: 734,847
[22] Filed: May 16, 1985
[51] Int. Cl.⁴ .............................................. F16K 15/02
[52] U.S. Cl. .................................. 137/514; 137/514.5
[58] Field of Search ............................. 137/514, 514.5
[56] References Cited
U.S. PATENT DOCUMENTS
2,927,604 3/1960 Johnson ............................. 137/514.5
3,044,487 7/1962 Dotter .................................. 137/514

Primary Examiner—Robert G. Nilson
Attorney, Agent, or Firm—Carothers & Carothers

[57] ABSTRACT

A novel and improved hydraulic check valve assembly comprised of an arrangement of coaxially interfitted, generally cylindrical elements that are clamped between a pair of coaxial end flanges and wherein valve opening and closing occurs by movement of independently movable and coaxially interfitted inlet and outlet seat members in response to the impetus of fluid flow encountered in the valve, the movement of at least one of the inlet and outlet seat members being cushioned by in a hydraulic fluid cushion to dissipate impact forces and consequent valve wear associated with sudden flow direction reversals.

8 Claims, 3 Drawing Figures

HYDRAULIC CHECK VALVE

In the art of hydraulic flow control devices it is well known to provide check valves which are installed in a hydraulic fluid flow line to provide unidirectional fluid flow therein. Typically, such valves respond to the pressure differential and flow forces which are imposed by the fluid passing therethrough to open or close the valve, depending upon the direction of fluid flow impetus encountered.

Prior U.S. Pat. No. 3,044,487 of the inventor herein is one example of a check valve with cushioned valve seat movement.

The present invention contemplates a novel and improved hydraulic check valve of simplified design and assembly, and with improved valve element cushioning characteristics to alleviate the well known water hammer effect and other undesirable effects of forceful valve closing and opening. According to one presently preferred embodiment of the invention, a hydraulic check valve assembly is provided entirely by an arrangement of coaxially interfitted, generally cylindrical elements that are clamped between a pair of coaxial end flanges. The end flanges, respectively, provide the valve with an inlet and an outlet for fluid flow therethrough. Accordingly, the invention eliminates the prior need for a cast value body and results in a significant cost benefit.

The invention further contemplates a hydraulic check valve with improved fluid cushioning of the movable inlet and outlet seat elements on both opening and closing of the valve to thereby minimize impact loads on the valve seat elements and the consequent cumulative damage and wear which would otherwise result.

It is therefore one general object of the invention to provide a novel improved hydraulic fluid flow check valve.

Another object of the invention is to provide a hydraulic fluid flow check valve of simplified structure.

Another object of the invention is to provide a hydraulic check valve with fluid cushioning to cushion the movement of the valve seating elements which are movable to open and close the valve.

A more specific object of the invention is to provide a hydraulic check valve assembly which is comprised entirely of a plurality of coaxially interfitted valve elements which are clamped between a pair of spaced apart end flanges by tension rods.

Another more specific object of the invention is to provide a hydraulic check valve with restricted flow path portions to provide for improved fluid cushioning of the valve inlet and outlet seat elements on both the opening and closing cycles of the valve.

These and other objects and further advantages of the invention will be more clearly understood upon consideration of the following detailed description and the accompanying drawings, in which.

Figure 1:
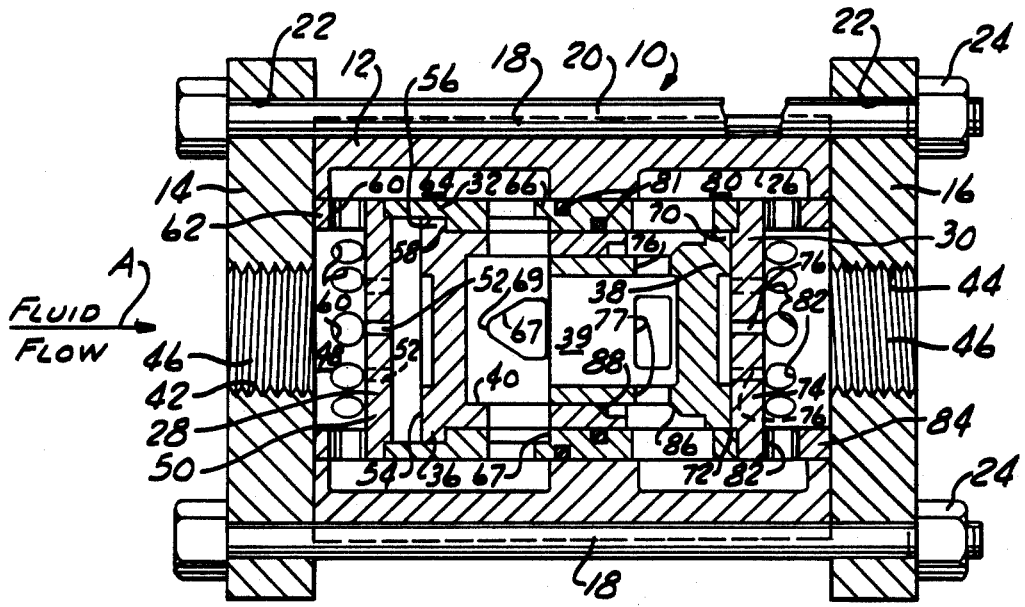
FIG. 1 is a sectional side elevation of a check valve of the instant invention shown in the open flow configuration.
Figure 2:
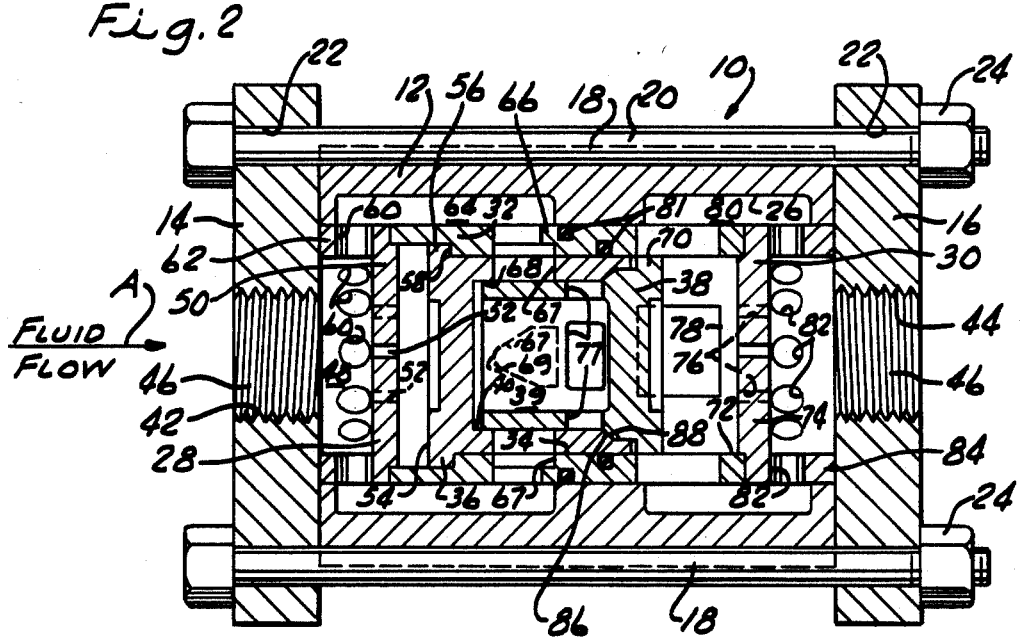
FIG. 2 is a view similar to FIG. 1 showing the valve in a configuration intermediate the fully open and fully closed configurations.
Figure 3:
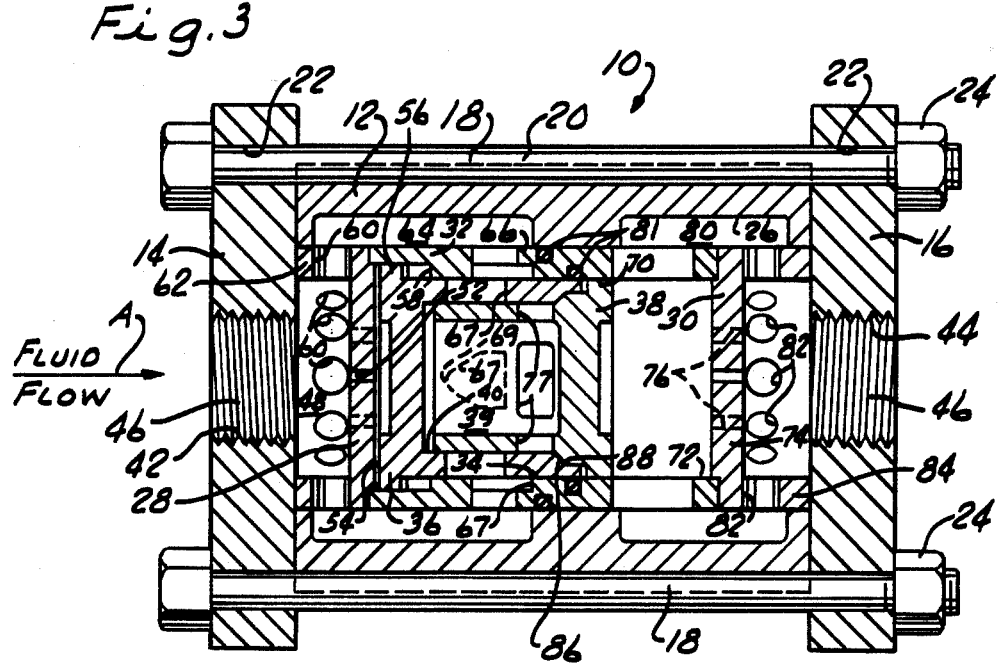
FIG. 3 is a view similar to FIG. 1 showing the valve fully closed.

There is generally indicated at 10 in FIGS. 1 through 3 a check valve assembly according to one presently preferred embodiments of the instant invention. Valve 10 comprises an elongated generally cylindrical housing or body 12 which is captively retained coaxially intermediate a pair of end flanges 14 and 16 as by a plurality of circumferentially spaced, axially extending tie rod assemblies 18. Each tie rod assembly 18 comprises an elongated bolt 20 which passes through axially aligned bores 22 in the respective flanges 14 and 16, and a nut 24 which is tightly threaded onto the bolt 20 to rigidly retain housing 12 intermediate flanges 14 and 16. Each rod 20 is nested within a radially inwardly formed longitudinally extending scallop 19 formed in body 12.

An axially extending, generally stepped through bore 26 extends within body 12 to closely receive coaxially therewithin a pair of axially spaced apart, unitary, inlet and outlet water hammer control segments 28, 30 adjacent the respective inlet and outlet flanges 14 and 16. An elongated, generally cylindrical bushing 32 extends coaxially intermediate control segments 28 and 30, and resides in firmly abutting relationship therewith in the assembled valve 10.

An axial stepped through bore 34 extends within bushing 32 and slideably receives therein a generally cylindrical inlet seat member 36 and a generally cylindrical outlet seat member 38 which is supported partially within bore 34 and partially by sliding engagement within a blind bore 40 formed coaxially within inlet seat 36.

Each of flanges 14 and 16 is provided with a preferably axial through bore 42, 44, respectively which is adapted as by threads 46 or the like for connection to fluid flow conduits (not shown), whereby fluid may flow through the conduits in the direction indicated by arrow A through valve 10. As will be described hereinbelow, the structure and operation of the check valve 10 preclude reverse flow of fluid in the direction opposite arrow A.

Typically, the fluid conduits and the valve 10 will be part of a hydraulic fluid flow system and will be continuously filled solid with fluid. More specifically, and referring particularly to FIG. 1, fluid flow under pressure in the direction of arrow A passes via bore 42 into a cavity 48 formed between the inner side of flange 14 and an end plate portion 50 of the unitary control segment 28. The fluid thence passes via restricted flow control ports 52 in end plate portion 50 to apply the fluid pressure to the adjacent face 54 of inlet seat 36. The seat 36 is thereby moved axially to and maintained at an extreme position whereat a flange portion 56 thereof abuts an annular shoulder 58 formed as a step in bore 34 within bushing 32.

The fluid flow from cavity 48 also is directed via a plurality of circumferentially spaced, radial through bores 60 formed in a cylindrical skirt portion 62 of unitary control segment 28, into an annular undercut 64 formed on the interior periphery of body 12, and thence via aligned radial ports 66, 67 in bushing 32 and inlet seat 36, respectively, to outlet seat 38. Ports 67 are tapered in the axial direction to a narrow end 69.

As valve 10 initially opens, outlet seat 38 is initially in the position shown in FIG. 2 and the hydraulic fluid flow reaches the rearward end thereof by leaking from port 67 in a controlled fashion axially along a circumferential clearance provided at 68 between the slideably interfitted and overlapping inlet and outlet seats 36 and 38. The fluid pressure thus accumulates behind outlet seat 38 and urges it to the open position as shown in FIG. 1. It is to be noted that when valve 10 is closed, the interior cavity 39 within outlet seat 38 is completely isolated from upstream fluid flow but for the clearance at 68.

As outlet seat 38 moves toward its open position under the impetus of fluid flow from the upstream direction, an enlarged piston head portion 70 thereof is closely slideably received within an end portion 72 of bushing bore 34 adjacent to an end plate portion 74 of the control segment 30. A volume of fluid is thereby trapped or confined between piston head 70 and end plate portion 74 to cushion the opening stroke travel of outlet seat 38. End plate portion 74 is provided with a plurality of small axial through bores 76 which are similar in all salient respects to the above described ports 52 and are effective to restrict and thereby control the escape of cushioning fluid from bore portion 72 during the cushioning portion of the outlet seat opening stroke.

As will be readily appreciated, outlet seat 38 is provided with a plurality of radial ports 77 which, when outlet seat 38 is in the fully opened position as in FIG. 1, communicate openly with cooperating radial ports 78 in bushing 32 to direct fluid flow from the cavity 39 within outlet seat 38 and thence to a second annular undercut 80 in body 12 which is similar in all salient respects to above described undercut 64. The fluid flow thence passes from undercut 80 via a plurality of circumferentially spaced radial ports 82 in a cylindrical skirt portion 84 of control segment 30 to bore 44 and the fluid conduit connected thereto. Accordingly, FIG. 1 illustrates the valve configuration for open fluid flow in the direction of arrow A.

In the event pressure is lost on the inlet or upstream side of valve 10, the valve will close to preclude fluid backflow in the opposite direction. More specifically, with reference to FIGS. 1 and 2, loss of pressure on the upstream side of valve 10 will result in loss of pressure in the cavity 39 behind outlet seat 38. Accordingly, fluid pressure from the downstream side of valve 10 will act, via ports 76 to exert a bias upon piston head 70 of outlet seat 38 and thereby urge the outlet seat 38 toward the position shown in FIG. 2. As the outlet seat 38 moves, ports 77 are progressively cut off from communication with the downstream side of the valve 10 before the overlap at 68 between the inlet and the outlet seat members is established. Accordingly, any residual fluid pressure within cavity 39 tends to dissipate to the conduit backpressure whereby the pressure differential tending to urge outlet seat element 38 toward the position of FIG. 2 is increased. Upon reaching the position shown in FIG. 2, mating circumferential seating surfaces 86 and 88 of the outlet and inlet seats, respectively, come into sealing abutment to seal the interface therebetween against reverse direction fluid flow. As noted above, at this position ports 77 are past the smaller diameter edge of seating surface 88 and thus are completely closed to reverse fluid flow. Furthermore, the axial overlap at 68 is once again established between the inlet and outlet seats 36 and 38. It will also be noted that the ports 77 remain axially spaced from ports 67 and therefore are never in direct fluid flow communication therewith. Accordingly, as the outlet seat 38 moves into sealing engagement with inlet seat 36, a volume of fluid is trapped or confined within cavity 39 and upon further movement of outlet seat 38 in the closing direction to engage seating surface 86 and 88, a fluid cushioning effect is provided within cavity 39 to dissipate the kinetic energy of outlet seat 38 closing stroke movement.

Continued fluid pressure impetus on piston head 70 acts through the sealingly engaged surfaces 86 and 88 to urge inlet seat 36 toward its extreme closed position as shown in FIG. 3. The fluid confined intermediate inlet seat 36 and plate portion 28 cushions the further closing stroke travel of inlet and outlet seats 36 and 38. The confined fluid escapes via restricted ports 52 to the upstream side of valve 10 as the inlet and outlet seats 36 and 38 move to the fully closed position as shown in FIG. 3.

When fluid flow in the normal direction is once again established, the valve 10 will again open in the manner described hereinabove.

It is to be appreciated that suitable seals such as O ring seals disposed in suitably formed grooves as at 81 may be utilized as necesary to provide the requisite sealed interfaces for reliable valve operation. Furthermore, it is to be appreciated that the cushioning responses of the valve as above described may be varied by variation of the cross-sectional area and/or number of ports 52 and 76.

According to the description herein, the present invention provides a novel and improved check valve apparatus for use in control of fluid flow direction in hydraulic power systems and the like. Of course, only a particular presently preferred embodiment of the invention has been disclosed herein, and various alternative and modified embodiments will readily occur to those skilled in the art. Accordingly, it is intended that the invention be construed as broadly as permitted by the scope of the claims appended hereto.

I claim:

1. A hydraulic check valve comprising:
   an elongated body having a stepped through bore formed therein;
   inlet and outlet flanges retained in sealing abutment with the axial ends of said body and having respective axial through openings which communicate with said bore and are adapted for connection to respective inlet and outlet fluid flow conduits to provide respectively, a fluid inlet to and a fluid outlet from said valve;
   a cylindrical bushing means carried coaxially within said through bore;
   generally cylindrical inlet and outlet seat means disposed coaxially within said bushing means;
   said inlet and outlet seat means being independently movable to axial positions defining respective closed and open configurations of said valve;
   said bushing means being cooperable with said inlet and outlet seat means and with interior peripheral portions of said body to define a fluid flow path between said inlet and said outlet flanges;
   said inlet and outlet seat means being coaxially interfitted and relatively axially slideable in response to fluid flow impetus within said flow path in a manner that said inlet and outlet seat means are maintained in a closed configuration of abutting sealed engagement to interrupt said flow path when said valve is closed and are maintained in an open configuration of axially spaced relationship with respect to said closed configuration when said valve is open;
   control means adjacent each of said end flanges to provide continuous restricted fluid communication of a given magnitude between, respectively, said inlet and one axial end of said inlet seat, and said outlet and one axial end of said outlet seat to provide a cushioning response for cushioning the movement of valve elements; and during both the opening and the closing of said valve at least one of said inlet and said outlet seat means being cooperable with the respective said control means during movement thereof to a position adjacent the respective said control means whereby the said cushioning response cushions the movement of the said one of said inlet and outlet seat means.

2. The valve as claimed in claim 1 wherein said inlet and outlet seat means are coaxially slideably interfitted in a manner to confine hydraulic fluid therebetween for cushioning the relative motion therebetween upon movement thereof to said closed configuration.

3. The valve as claimed in claim 2 wherein said bushing and said control means are maintained in axially abutting sealed relationship within said body and extend continuously intermediate said end flanges whereby said bushing and said control means are axially fixed with respect to said body.

4. The valve as claimed in claim 3 additionally including a plurality of longitudinally extending tie rod means spaced circumferentially of said body and engaging said end flanges to retain said end flanges in said sealing abutment with said body and thereby maintain said valve in its assembled configuration.

5. The valve as claimed in claim 4 wherein said body includes a plurality of axially extending recesses and each said tie rod is nested within one of said recesses.

6. The valve as claimed in claim 2 wherein said fluid flow path is open for fluid flow therethrough only when said inlet and outlet seat means are not coaxially interfitted in a manner to confine hydraulic fluid therebetween.

7. The valve as claimed in claim 6 wherein said control means are selectively replaceable with control means having a magnitude of restricted fluid communication different from said given magnitude to alter said cushioning response.

8. In a hydraulic fluid check valve wherein an assembly of valve components is retained in its assembled configuration intermediate a pair of spaced inlet and outlet flanges which are secured together with longitudinal tension means, said assembly of valve components comprising:

an elongated body member having a through bore which extends between said end flanges;

a hydraulic fluid flow control segment received within said bore adjacent to each of said end flanges;

an elongted cylindrical bushing means extending axially within said bore intermediate said fluid flow control segments to retain each of said control segments adjacent the respective said end flange;

inlet and outlet seat means disposed within said bushing and axially slideable therein to an open configuration and a closed configuration of said valve in response to fluid flow impetus within said valve;

said inlet and outlet seat means being partially coaxially interfitted and being relatively axially movable in conjunction with movement thereof to said open and said closed configurations;

a hydraulic fluid flow path extending within said assembly and including a flow path portion extending from the inlet of said valve to said outlet seat means; and said portion of said fluid flow path being selectively closed and opened to fluid flow therethrough in response to the extent of axially interfitted engagement between said inlet and said outlet seat means.

* * * * *